United States Patent [19]
Velzel

[11] 3,849,003
[45] Nov. 19, 1974

[54] INTERFEROMETER APPARATUS FOR MEASURING THE ROUGHNESS OF A SURFACE
[75] Inventor: Christiaan Hendrik Frans Velzel, Emmasingel, Eindhoven, Netherlands
[73] Assignee: U.S. Philips Corporation, New York, N.Y.
[22] Filed: Apr. 6, 1973
[21] Appl. No.: 348,686

Related U.S. Application Data
[63] Continuation of Ser. No. 126,149, March 19, 1971, abandoned, and a continuation-in-part of Ser. No. 859,989, Sept. 22, 1971, Pat. No. 3,676,006.

[30] Foreign Application Priority Data
Mar. 25, 1970 Netherlands ............... 7004247

[52] U.S. Cl. ............................................ 356/109
[51] Int. Cl. ........................................ G01b 9/02
[58] Field of Search ................... 356/106, 108, 109

[56] References Cited
UNITED STATES PATENTS
2,764,055  9/1956  Clemens et al. ............... 356/106 R
3,520,615  7/1970  Smith ............................ 356/106 R
3,561,876  2/1971  Hoffman ....................... 356/106 R Primary Examiner—John K. Corbin
Assistant Examiner—Conrad Clark
Attorney, Agent, or Firm—Frank R. Trifari; Simon L. Cohen

[57] ABSTRACT

An apparatus for measuring the roughness of a surface is described which includes an optical system by means of which two images of the surface which have a mutual phase difference and displacement are superposed on one another.

It is disserted that for this purpose the phase difference is produced between two sub-beams polarized in directions at right angles to one another by means of an electro-optical modulator, the displacement being effected in an interferometer which discriminates in respect of direction of polarisation.

It is set forth that the interferometer may include the series arrangement of the two Wollaston prisms which produce opposite angle splittings between cross-polarized beams of radiation which enter the series arrangement.

3 Claims, 3 Drawing Figures

INTERFEROMETER APPARATUS FOR MEASURING THE ROUGHNESS OF A SURFACE

This application is a continuation of Ser. No. 126,149 filed Mar. 19, 1971, and now abandoned, and is a continuation-in-part of application Ser. No. 859,989, filed Sept. 22, 1969 now U.S. Pat. No. 3,676,006.

The invention relates to an improved apparatus for measuring the roughness of a surface, which apparatus includes an optical system by means of which two images of the surface which show relative phase difference and displacement are superposed on one another.

Such an apparatus has been proposed in Dutch Patent Application No. 6,813,608 corresponding to U.S. Pat. No. 3,676,006. The apparatus described in this application has the disadvantage of being sensitive to vibrations and to defects in the optical components.

It is an object of the invention to provide an improved apparatus of the type described in the said Patent Application which does not suffer from this disadvantage. The improvement consists in that the phase difference is provided between two sub-beams polarized at right angles to one another by means of an electro-optical modulator and in that the displacement is effected in an interferometer which discriminates in respect of direction of polarization.

This step enables a stable interferometer having no moving parts to be built.

Embodiments of the invention will now be described, by way of example, with reference to the accompanying diagrammatic drawings, in which.

Figure 1:
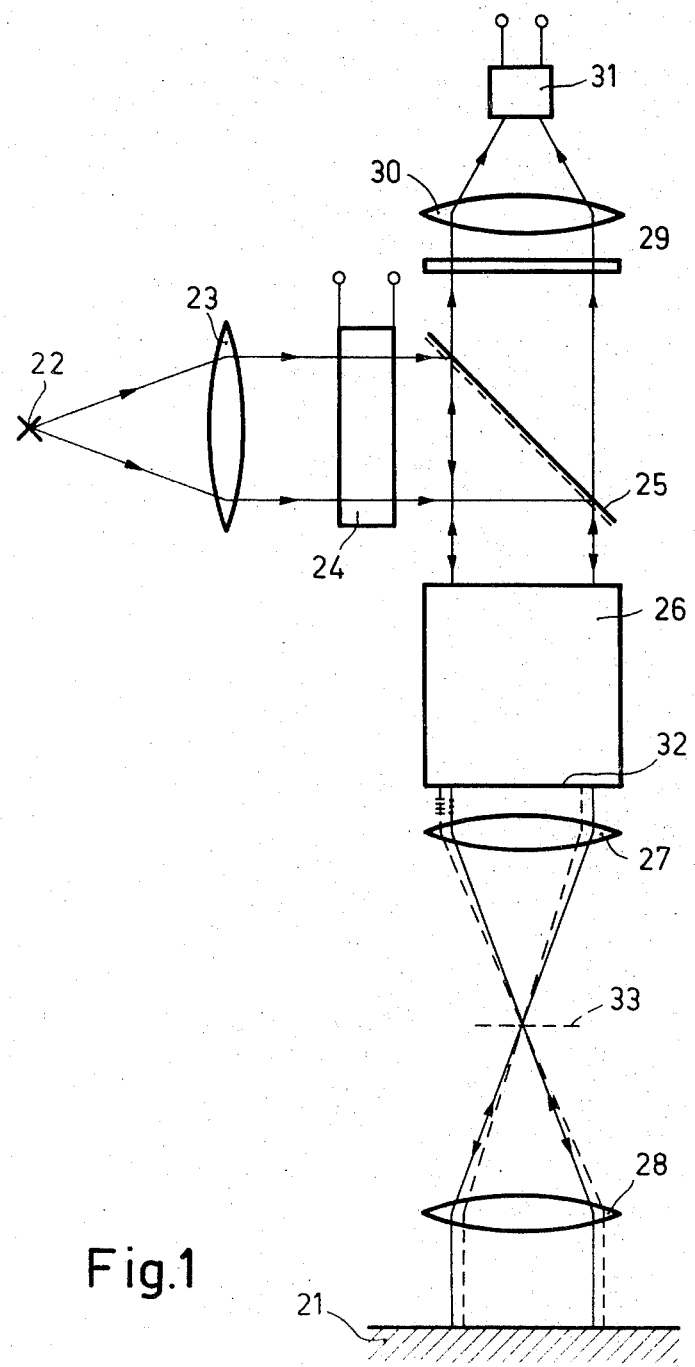
FIG. 1 shows an embodiment of an apparatus according to the invention.

Referring now to FIG. 1, reference numeral 21 denotes an object subject to unevennesses, for example a fairly highly polished slice of silicon serving as a starting material in the manufacture of integrated circuits. A reasonably monochromatic radiation from a radiation source 22, for example a mercury vapour lamp, is converted by a collimator lens 23 into a parallel beam of radiation which is applied to an electro-optical modulator 24. From the modulator there emerge sub-beams which are polarized at right angles to one another and differ in phase from one another. This is achieved by applying a suitable electric potential in the direction of propagation of the radiation beam.

The sub-beams emerging from the modulator are reflected at an isotropic beam-splitting mirror 25 and then traverse an interferometer 26. When the sub-beams emerge from the interferometer they have a mutual displacement which is adjustable. This is achieved by suitable construction of the interferometer. The sub-beams then pass through a field lens 27 and are converted by way of the focal plane 33 of the field lens, which plane at the same time is the focal plane of the objective 28, and by way of the objective 28 into parallel sub-beams which are reflected at the object 21 to be examined.

Up to the beam-splitting mirror the reflected sub-beams follow the same path as the outgoing sub-beams but in the reverse direction. An intermediate image 32 of the object 21 is formed in the entrance plane of the interferometer 26.

The sub-beams which emerge from the interferometer 26 towards the beam-splitting mirror 25 have been re-combined. The re-combined sub-beams transmitted by the beam-splitting mirror pass through an analyzer 29 the direction of polarization of which is at an angle of 45° to that of the sub-beams. A lens 30 converges the sub-beam components transmitted by the analyzer 29. The converged beams fall on a detector 31.

The electric signal produced in the detector 31 has the form $$S = S_o [1 + \gamma(\delta) \cos \{\phi_m + \phi(\delta)\}]$$

where
- $\gamma(\delta)$ is the modulation depth to be measured as a function of the displacement $\delta$ caused by the interferometer 26;
- $\phi_m$ is the phase difference which is produced by the modulator 24 between the cross-polarized sub-beams produced in the modulator;
- $\phi(\delta)$ is a phase term due to the surface roughness of the object 21 as a function of the displacement $\delta$.

$\phi_m$ is given the following form:

$$\phi_m = \phi_o + \phi_1 \sin \omega t,$$

where $\phi_o$ and $\phi_1$ are constants. This is obtained by applying to the electrodes of the electro-optical modulator 24, which may be a KDDP (potassium dideuterium phosphate) crystal, a voltage which is the superposition of a constant voltage $V_o$ and an alternating voltage $V_1 \sin \omega t$. Obviously $\phi_o$ is proportional to $V_o$ and $\phi_1$ is proportional to $V_1$.

The signal S may be written:

$$S = S_o + S_o \gamma(\delta) \cos \{\phi_o + \phi(\delta)\} \cos \{\phi_1 \sin \omega t\} - S_o \gamma(\delta) \sin \{\phi_o + \phi(\delta)\} \sin \{\phi_1 \sin \omega t\}$$

The alternating-current component at the frequency $\omega$ of the signal will be a maximum if $$\phi_o + \phi(\delta) = (2n + 1) \rho/2$$

In this case the signal will be:

$$S_1 = S_o - S_o \gamma(\delta) \sin \{\phi_1 \sin \omega t\}$$

By filtering this signal in a narrow frequency band about $\omega$ it will become:

$$S_\omega = -S_o \gamma(\delta) J_1 (\phi_1) \sin \omega t,$$

where $J_1 (\phi_1)$ is the Bessel function of the first order with the argument $\phi_1$.

The reference signal $S = S_o$ is measured by rectifying the signal $S_1$.

Figure 2:
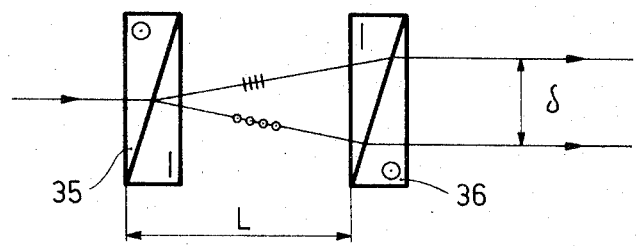
FIG. 2 shows a first modification of a component part of the apparatus shown in FIG. 1.

The interferometer 26 may be any one of several known types. In FIG. 2 one of these types is shown schematically. In the interferometer of FIG. 2 the sub-beams traverse the series arrangement of the two Wollaston prisms 35 and 36 which produce opposite angle splittings between the two cross-polarized sub-beams which enter the series arrangement. The angle splitting produced in the Wollaston prism 35 is compensated in the Wollaston prism 36. Since the compensation is not effected in the same plane as is the splitting, the two beams suffer a displacement $\delta$ which depends upon the distance L between the two prisms. $\delta$ may be continuously varied by variation of the distance L.

Figure 3:
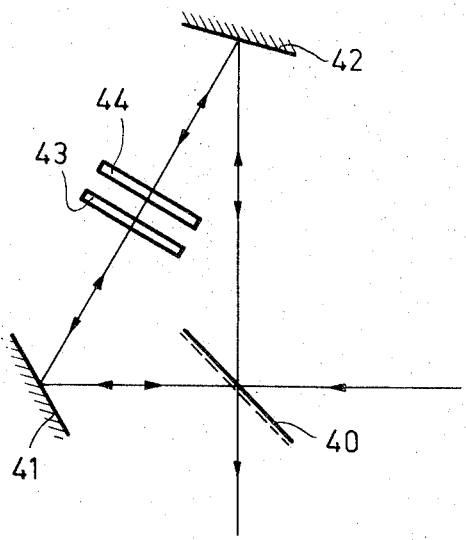
FIG. 3 illustrates a second modification of the same component part of the apparatus shown in FIG. 1.

An alternative interferometer 26 is shown schematically in FIG. 3. The beam of radiation entering the interferometer is partially reflected and partially transmitted by a beam-splitting mirror 40. Both the reflected and the transmitted sub-beams are reflected at two plane mirrors 41 and 42 inclined at equal angles to the plane of the beam-splitting mirror 40. The series arrangement of a polarizer 43 and a λ/2 plate 44 is inserted in the path of the sub-beams between the plane mirrors 41 and 42. The direction of polarization of the polarizer 43 is parallel to the direction of polarization of one of the cross-polarized sub-beams entering the interferometer. The principal direction of the λ/2 plate 44 is parallel to the direction of polarization of the polarizer 43. As a result, the sub-beams which return to the beam-splitting mirror are again cross-polarized. The assembly of the polarizer 43 and the λ/2 plate 42 may be omitted if the beam-splitting mirror 40 is a polarization separating mirror.

Displacement of the mirrors 41 and 42 in a direction at right angles to the plane of the beam-splitting mirror 40 produces the displacement δ.

The radiation source may be a mercury-vapour lamp, for the auto-compensation which occurs in the interferometer 26 produces independence from the spatial coherence of the light source.

What is claimed is:

1. An apparatus for measuring the roughness of a surface, comprising an electro-optical modulator having electrical terminals for receiving a periodic electrical signal, means for projecting substantially monochromatic radiation through the electro-optical modulator, the electro-optical modulator thereby providing two aligned orthogonally polarized sub-beams having a periodically varying phase difference, an interferometer in the path of the sub-beams from the electro-optical modulator for spatially displacing the sub-beams in accordance with the direction of polarization, means in the interferometer for continuously varying the spatial displacement of the subbeams, means for superimposing the initially displaced sub-beams on the surface to be measured and for directing reflected radiation from the surface back to the interferometer wherein the spatial displacement between the sub-beams is removed, an analyzer in the path of the re-combined reflected sub-beams, and a photo detector in the path of the beams passing through the analyzer.

2. An apparatus as claimed in claim 1, wherein the interferometer comprises two serially arranged Wollaston prisms for producing opposite angle-splittings between the cross-polarized beams of radiation entering the interferometer.

3. An apparatus as claimed in claim 1, wherein the interferometer comprises a beam-splitting mirror in the path of the sub-beams from the modulator, two plane mirrors inclined at equal and opposite angles to the plane of the beam-splitting mirror, the beam-splitting mirror receiving the substantially monochromatic radiation, splitting it into partial beams and directing each partial beam to a separate one of the two plane mirrors, the partial beams thereby propagating in opposite directions along the same internal path from the beam-splitting mirror to each plane mirror and back to the beam-splitting mirror, a polarizer in the internal path of both partial beams, and a half-wave plate serially arranged with the polarizer within the internal path of the interferometer.

* * * * *

PHN 4767A

UNITED STATES PATENT OFFICE
CERTIFICATE OF CORRECTION

Patent No. 3,849,003         Dated November 19, 1974

Inventor(s) CHRISTIAAN HENDRIK FRANS VELZEL

It is certified that error appears in the above-identified patent and that said Letters Patent are hereby corrected as shown below:

IN THE SPECIFICATION

Col. 2, line 43, "p/2" should be -- $\pi/2$ --;

Signed and sealed this 18th day of February 1975.

(SEAL)
Attest:

RUTH C. MASON
Attesting Officer

C. MARSHALL DANN
Commissioner of Patents
and Trademarks